United States Patent [19]

Frantello

[11] 4,201,034
[45] May 6, 1980

[54] ATTACHMENT FOR DRIVE SHAFT OF ROTARY LAWN MOWERS

[75] Inventor: Alfred A. Frantello, Satellite Beach, Fla.

[73] Assignee: Corinth Co. Inc., Melbourne, Fla.

[21] Appl. No.: 925,530

[22] Filed: Jul. 17, 1978

Related U.S. Application Data

[63] Continuation-in-part of Ser. No. 880,987, Feb. 24, 1978.

[51] Int. Cl.² ............................................. A01D 55/18
[52] U.S. Cl. ....................................... 56/295; 56/12.7
[58] Field of Search ..................... 56/295, 12.7; 30/276

[56] References Cited

U.S. PATENT DOCUMENTS

| | | | |
|---|---|---|---|
| 4,058,959 | 11/1977 | Moss et al. | 56/295 |
| 4,112,653 | 9/1978 | Ballas et al. | 56/295 |

*Primary Examiner*—Jay N. Eskovitz

[57] ABSTRACT

An attachment is provided for the end of the drive shaft of the motor of a rotary lawn mower, edger, trimmer or the like which comprises an elongated member that extends transversely of said drive shaft and carries at each end a rigid container having removably disposed therein a spool of non-metallic cutting line which extends from the spool and through the rigid container into the cutting plane, means being provided whereby the spools, which are oppositely disposed with respect to each other, may be easily and quickly made capable of either free movement or secured thereagainst; with the spools capable of quick and easy replacement when such is found necessary or desirable.

3 Claims, 4 Drawing Figures

U.S. Patent  May 6, 1980  4,201,034
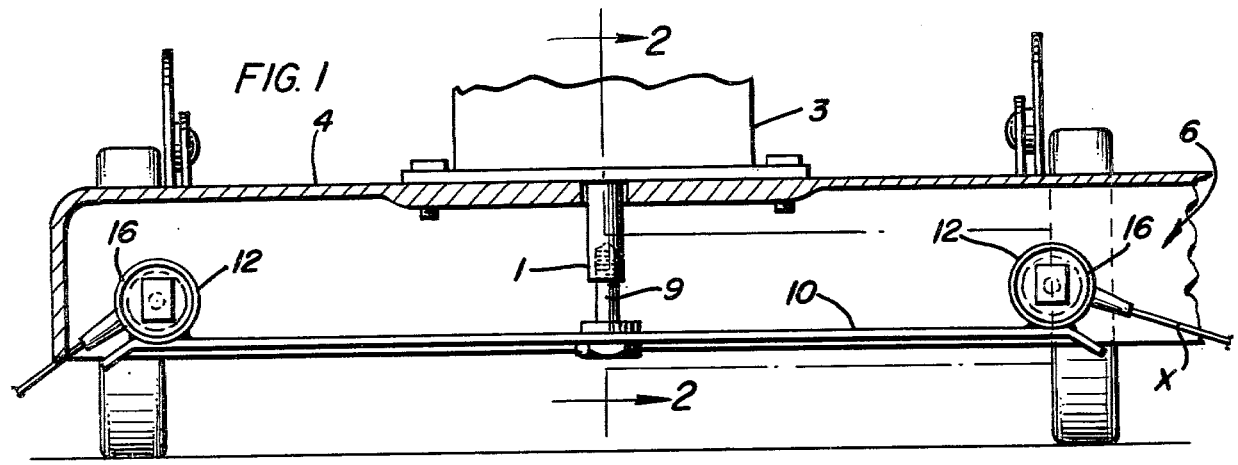
FIG. 1
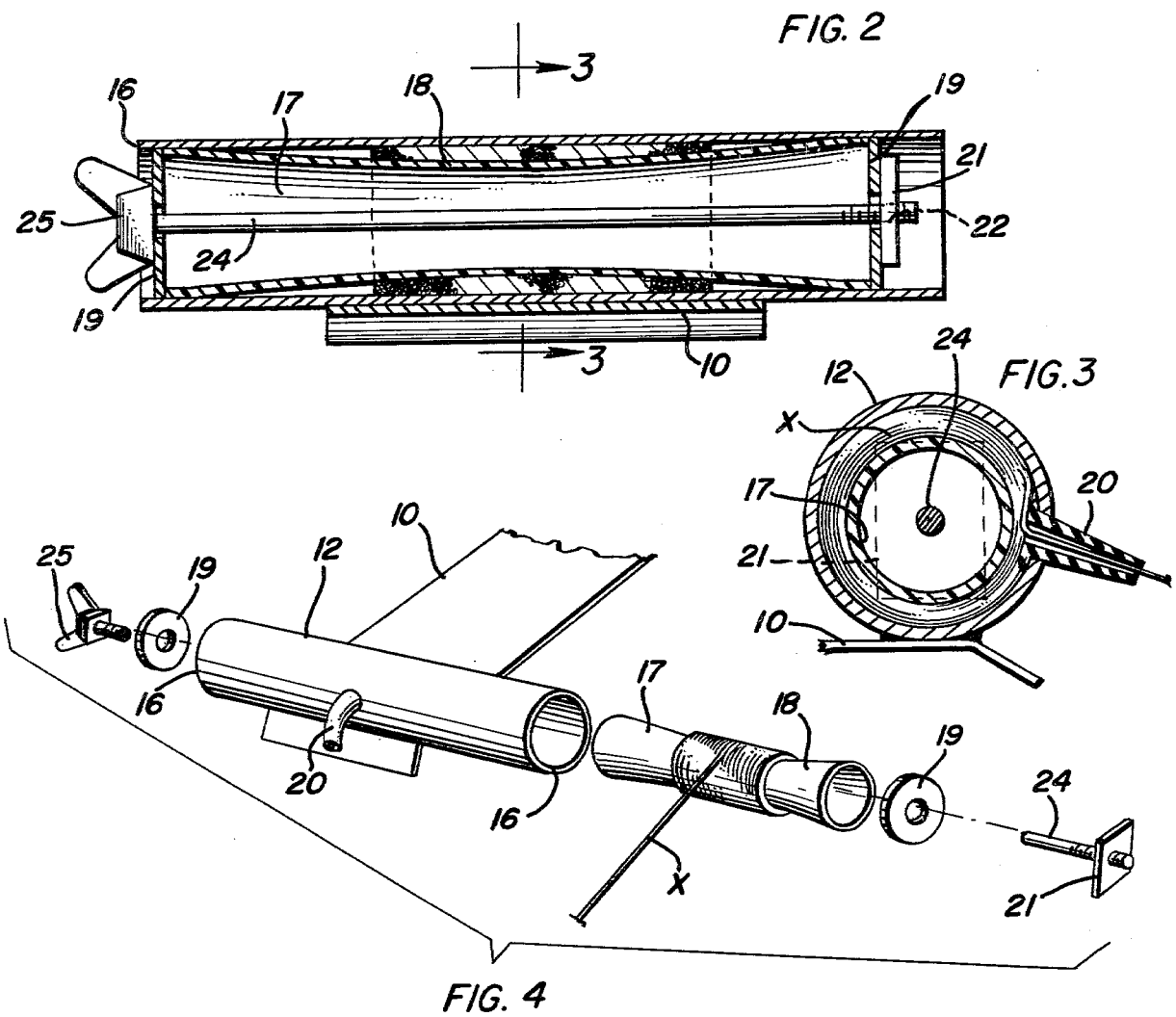
FIG. 2
FIG. 3
FIG. 4

ATTACHMENT FOR DRIVE SHAFT OF ROTARY LAWN MOWERS

The present application is a continuation-in-part of my presently pending patent application Ser. No. 880,987, filed Feb. 24, 1978.

This invention relates to an improved device in the form of a rotary head for attachment to the lower end of the driving shaft of the motor (electric or internal combustion) of a conventional rotary lawn mower, edger, trimmer or the like, and principally readily portable hand-held type lawn mowing and edging tools.

The rotary head, or cutting blade, of rotary lawn mowers, edgers, and the like, have until the past few years, comprised a rotating metal bar with sharpened edges, which is rotated at sufficient speeds to effect cutting of grass, weeds, or the like. However, such rotating metal bars create and project dangerous missiles which may strike and injure the operator or persons or animals who are adjacent the machine when it is in operation.

Due to the dangerous conditions created by the older and more conventional rotating head, most lawn edging and trimming around trees and the like, which would otherwise be damaged by, or because of, the metal blades, must be done manually; and this is both laborious and time-consuming.

There have been certain relatively recent developments which include lawn mowing or trimming devices comprising a disc-like head member arranged to be rotated by a suitable prime mower and containing a spool which is housed therein in coaxial alignment with the shaft of the motor, a length of flexible non-metallic line, usually monofilament fishing line, being coiled about the spool, whereby a free traveling end will be swung accurately about to cut adjacent vegetation in the manner of a flail.

It is true that certain prior art devices utilizing monofilament fishing line will cut or trim grass and other light vegetation with reasonable effectiveness, and possess the additional advantage that they are much safer to use than the more conventional metal-bar cutting blades in that they do not cause stones or other solid objects to be discharged in the dangerous manner earlier described and are almost completely incapable of causing any significance injury to adjacent persons, animals or objects.

On the other hand, the devices referred to immediately hereinbefore are subjected to certain disadvantages of a magnitude which severely limit their practical value. In the first place, they are largely effective only to cut standing light-weight vegetation, being practically useless for any other purpose. Secondly, they will only cut such vegetation if growing relatively sparsely, and cannot effectively handle even light-weight vegetation if it is in a rank condition.

The light-weight plastic cutting lines of the prior art devices referred to are of relatively small diameter, and therefore are relatively incapable of cutting any but the lightest and sparsest vegetation, which prevents such devices from possessing much commercial value.

The disadvantages of the prior art, and especially the aforementioned devices which utilize monofilament fishing line are overcome by the present invention, and commercially acceptable embodiments of a vegetation cutter and the like are herein provided which are not only fully capable of cutting vegetation under most operating conditions, but which are also fully capable of other tasks completely beyond the capabilities of the prior art devices of the same general type: such as cleaning dead leaves, trash and other such debris from along fences, walls, and the trunks or stems of trees and bushes. More importantly, however, is the fact that the embodiments of the present invention are capable of operation with a much lower breakage rate for their cutting strings, without any sacrifice whatsoever of the safety features and the cutting advantages which will be more fully described hereinafter.

Various attempts have been made to overcome the aforementioned hazardous conditions created with rotating rigid-type metal cutting blades, most of which involved the utilization of some type of flexible flail which will have sufficient resiliency so as not to propel objects which are struck at high velocities; but resiliency itself is not sufficient to insure that the dangerous conditions will not be created when rotation is effected at necessary cutting speeds.

Another and great disadvantage of prior art cutting elements of the flexible flail type described, is that they are usually not provided with means for quick and easy replaceability in the event of wearing out, and they are usually quite time-consuming to replace.

It is among the objects of the present invention to eliminate the difficulties which were experienced with the devices of the prior art as described herein by providing a relatively simple device which very efficiently performs the desired cutting operation, is quickly and easily adjustable, and which may be quickly and easily substituted for the usual horizontally-extending metallic cutting bar of a conventional rotary lawn mower.

Another object is the provision of a device possessing the foregoing advantages which is durable in service and which may be easily and inexpensively manufactured.

The foregoing and other objects and advantages will become more readily understood from the following description and annexed drawings wherein like reference numerals designate like elements and wherein:

FIG. 1 is an elevational view, partly in section, which generally illustrates the apparatus of the invention as substituted for the horizontally extending metallic blade member of the more conventional rotary lawn mower;

FIG. 2 is an enlarged view, partly in section, which has been taken along the line 2—2 of FIG. 1;

FIG. 3 is a sectional view taken along the line 3—3 of FIG. 2; and

FIG. 4 is an exploded view of the central elements of the showing of one of the spool containers as will be more fully described hereinafter.

Referring more particularly to the drawings, the numeral 1 designates the lower end of the vertically disposed driven shaft of the internal combustion engine or electric motor of a conventional rotary mower 3.

As usual, the rotary mower 3 is provided with a housing 4 having therein an elevated opening or outlet 6 for discharging the cuttings of the mower which may be into a bag (not shown) which is in communication therewith.

As in the case of practically all of the popular makes of rotary mower, the lower extremity of the driven shaft 1 is provided with a screw-threaded recess which is adapted to receive a relatively short bolt 9 that secures in place the usual horizontally-extending metallic cutting bar (not shown).

According to the teachings of the present invention, there is substituted for the usual transversely-extending metallic cutting bar (not shown) a bar or plate 10 which extends at right angles to the drive shaft of the rotary motor 3 and carries adjacent its outermost edges a pair of cylindrical containers 12 of rigid or inflexible material, each of which comprises a spool holder such as described in my aforementioned patent application Ser. No. 800,987.

More specifically, each of this pair of cylindrical containers or spool-holders 12 has open ends 16; and the interior thereof is hollow and houses a line-receiving flexible spool 17, the sidewall of which is continuously concave, as indicated at 18. As shown, the concavity 18 is on a single radius of unvarying length.

A relatively short flexible tube 20 is carried on the exterior of each of the rigid cylindrical containers 12 and communicates through the wall of the rigid cylindrical container with the correspondingly adjacent portion of the continuously concave sidewall 18 of the flexible line-receiving spool 17 therewith. Each of said rigid cylindrical containers 12 is provided with a pair of widely spaced washers 19. One end of each of the rigid cylindrical containers 12 is provided with an adjustable block 21 which fits closely within the container 12 and is provided with a centrally disposed screw-threaded aperture 22. An elongated bolt 24 which extends through both of the widely-spaced washers 19, and one end screw-threadedly engages the adjustable block 21. The elongated bolt 24 within the flexible line-receiving spool 17 extends from the screw-threaded centrally disposed aperture in the adjustable block 21 into adjacency with the other end of said spool 17 and screw-threadedly engages a wing-nut 23, which may project beyond the adjacent open end 16 of the rigid or inflexible cylindrical container or spool-holder 12.

According to the foregoing construction and arrangement, the bolt 24 may be shortened or lengthened within the flexible line-receiving spool by rotation of either its head 25 or by rotation of the adjustable block 21, with the opposing end held against rotation.

The line X on the flexible line-receiving spools 17, which may be monofilament fishing line, is passed through the apertures in the wall of the rigid cylindrical container in which it is encased and through the adjacent flexible tube 20 and is adjusted to suitable length within the housing 4 of the rotary mower after which that portion of the bolt 24 which is within the flexible line-receiving spool is shortened in the manner earlier described to thereby lock the flexible line X against further passage through the flexible tube 20.

As indicated in the drawings, the relatively short flexible tubes 20 which are connected to the rigid cylindrical containers 12 may be constructed of two separable parts in the manner of a valve stem for tubeless tires for automotive vehicles.

As the outer ends of the non-metallic lines X wear, replacement of those portions thereof is necessitated; and this has long been a very big problem with the prior art line-receiving spools of the prior art of which I am presently aware; all of which require troublesome and time-consuming adjustment. In addition, the line-receiving spools of the prior art are unnecessarily complex and the cost of manufacture thereof unnecessarily high.

Due to the simplicity of the device of the present invention, when more line is needed, because of wear, etc., it is only necessary to slightly loosen the line-receiving flexible spool 17 within its respective rigid cylindrical container 12 by adjusting the wing-nut 25 on the bolt 24 or by adjusting the position of the adjustable block 21 on the bolt.

As earlier indicated, the device of the invention, as described herein, and shown in the drawings, is not only highly efficient and durable in service, but is so simple as to lend itself to ease and inexpensiveness of manufacture, whereby it can find a ready market for application to existing rotary mowers or trimmers, as well as comprise part of the original equipment if such is desired.

The teachings of the present invention contemplate the provision in each of the rigid cylindrical containers 12 of a pair of flexible line-receiving spools 17 in the manner shown and described in my patent application Ser. No. 880,987, filed Feb. 24, 1978, in which case the flexible line X may be paid out from either or both of the two spools through one of a pair of flexible tubes 20.

Just by tipping the lawn mower on its side approximately twenty degrees will enable the line to be inserted within the flexible tube 20. This enables all of the line X to be ultimately used, thus conserving waste and also enables the device to work in an efficient manner. The flexible stems 20 being in two separable parts, as previously mentioned, is helpful because whenever the operator runs out of line coming from the spool such construction will enable the extension to be unscrewed from the flexible stem. Then a knotted short piece of line inserted into the extension shown as at Y can thereafter be screwed back onto the flexible stem for continued cutting. The knotted end enables the line to be permanently inserted therein until replacement is needed.

Having thus described the invention, what I claim as new and desire to secure by Letters Patent is:

1. An attachment for the drive shaft of a rotary lawn mower comprising, in combination, a transversely extending element adapted for rotation and having centrally disposed means for enabling its attachment to the end of the drive shaft of the rotary lawn mower, a pair of rigid cylindrical sleeves secured to the most distantly spaced portions of said transversely extending element, a longitudinally compressible spool disposed in each of said distantly spaced rigid cylindrical sleeves of a supply of flexible cutting line carried by each of said spools, each of said rigid cylindrical sleeves having at least one aperture in the side-wall thereof whereby the outer end of said line may be threaded through and made to adjustably project from the outer end of said rigid cylindrical sleeves.

2. An attachment for the drive shaft of a rotary lawn mower comprising, in combination,
   (a) an elongated transversely extending element having centrally-disposed means for enabling attachment to the lower end of the drive shaft of the rotary lawn mower
   (b) a rigid cylindrical sleeve secured to each of the remote ends of said transversely extending element
   (c) a relatively short flexible tube extending through said rigid cylindrical sleeve and communicating with the interior thereof
   (d) a flexible spool disposed in each of said rigid cylindrical sleeves
   (e) a supply of flexible monofilament line carried by each of said spools
   (f) an elongated headed bolt extending through each of said spools (g) a pair of widely spaced washers carried by each of said elongated bolts with each pair disposed in contact with the ends of the adjacently disposed centrally-bored spool by which it is carried (h) one end of each of said relatively short flexible tubes extending adjacent the supply of flexible monofilament line carried by the adjacent spool, whereby the free end of the line thereon may be threaded through said relatively short flexible tube and made to project from the rigid cylindrical sleeve by which it is carried (i) said washers being adapted, upon compression, to correspondingly compress that portion of the adjacent flexible conical spool which extends through the rigid cylindrical sleeve associated therewith and secure the flexible monofilament line thereon against movement at that point.

3. An attachment for the drive shaft of a rotary lawn mower or the like comprising, in combination, (a) an elongated transversely extending element having centrally-disposed means for enabling attachment to the lower end of the drive shaft of the rotary lawn mower (b) a rigid cylindrical sleeve secured to each of the remote ends of said transversely extending element and disposed in substantial alignment with respect to each other (c) a relatively short flexible tube carried on the exterior of each of said rigid cylindrical sleeves and communicating with the interior thereof (d) a centrally bored longitudinally compressible spool disposed in each of said rigid cylindrical sleeves (e) a supply of flexible cutting line carried by each of said centrally bored longitudinally compressible spools (f) an elongated headed bolt extending through the bore of each of said spools (g) a pair of widely spaced washers slidably carried by each of said elongated bolts and adapted for contact with the ends of the adjacently disposed centrally bored longitudinally compressible spool (h) means for adjustably changing the position of at least one of each pair of widely spaced washers with respect to the elongated bolt on which it is carried to thereby longitudinally compress the adjacent line-receiving spool to an extent which will prevent further outward movement of the cutting line through the wall of the rigid cylindrical sleeve and the adjacent relatively short flexible tube.

* * * * *